Nov. 7, 1933.  K. C. D. HICKMAN  1,933,803
HYGROMETER
Filed Jan. 3, 1929
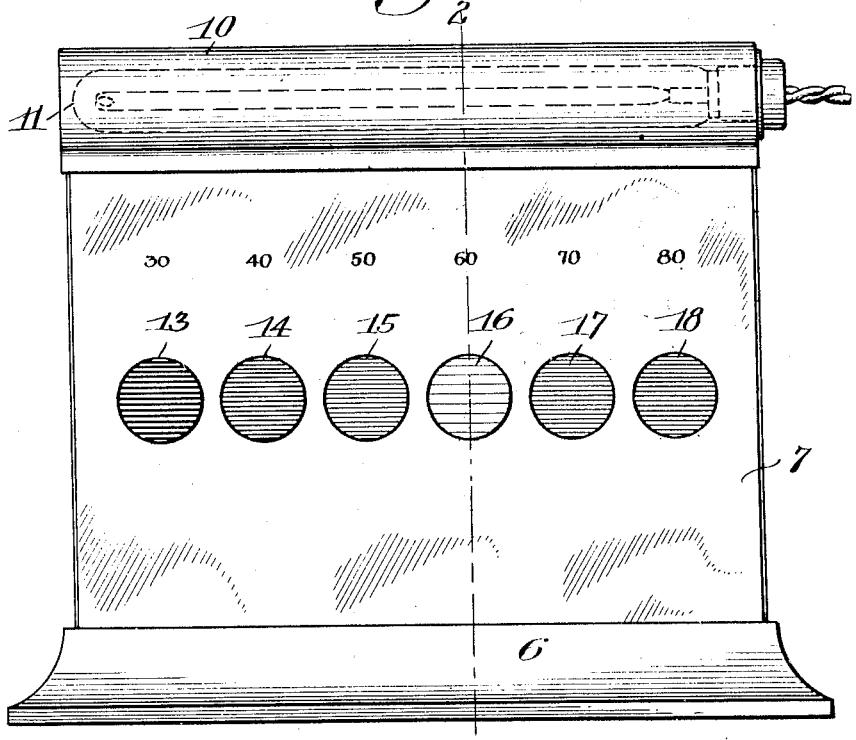
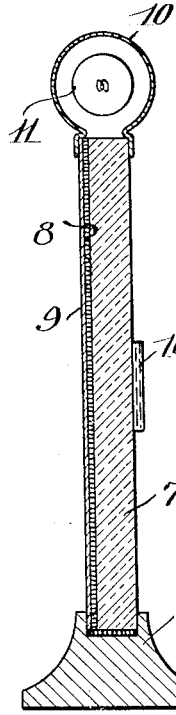
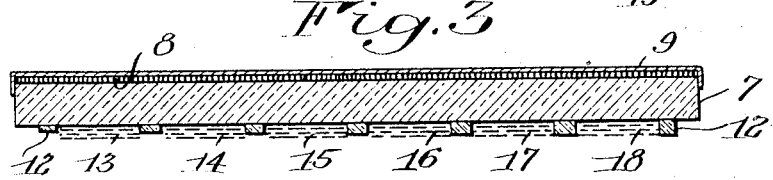
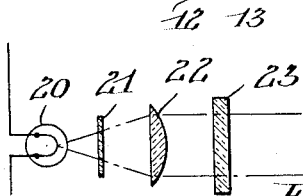
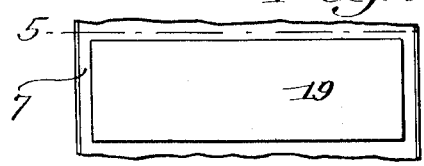
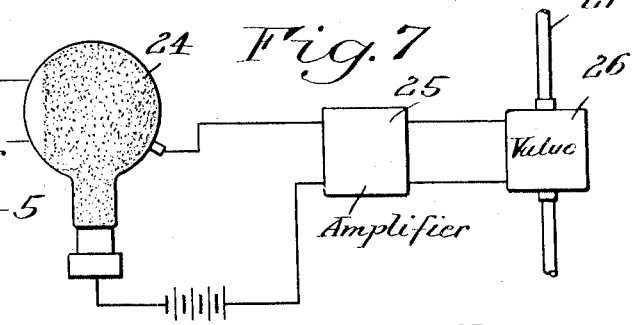
INVENTOR
Kenneth C. D. Hickman
BY
Newton M. Perrin
ATTORNEY Patented Nov. 7, 1933

1,933,803

UNITED STATES PATENT OFFICE 1,933,803

HYGROMETER

Kenneth C. D. Hickman, Rochester, N. Y., assignor to Eastman Kodak Company, Rochester, N. Y., a corporation of New York Application January 3, 1929. Serial No. 330,088

7 Claims. (Cl. 73—24)

The invention relates to devices for measuring humidity, commonly known as hygrometers.

Hygrometers in every day use may be divided into two broad classes: those which are self-indicating, and those, the indications of which must be interpreted through reference tables. The direct reading type are mechanical in operation and are not invariably reliable, while the indirect type are evidently not always convenient or amenable to unskilled use.

In accordance with the present invention, a hygrometer has been designed which may be read directly without the use of moving parts or tables of reference. The structure is simple and readily manufactured and its scale is easily read even by those not experienced in the use of such instruments.

In its broadest aspect the hygrometer employs a sensitive layer composed of two substances or mixtures of substances which are intimately mingled to produce a dispersion. The hygrometer depends for its action on the accentuation or diminution of certain physical differences between the two phases of the dispersion, in particular their relative optical refractive indices, by the alteration of the moisture content of the layer. To illustrate more specifically the broad application of the invention, an example may be considered wherein a gelatin solution in water constitutes the one substance and linseed oil constitutes the other. The melted gelatin and the linseed oil may be incorporated to form an emulsion by any of the well known methods. The emulsion will appear opaque and substantially white owing to the refractive index of the oily inner phase being greater than that of the outer watery phase. Let, now, a portion of the emulsion be flowed onto glass so that it sets to a jelly and finally dries. The dried pellicle will also be opaque and whitish because there is a difference in refractive index between the linseed droplets and the dry gelatin matrix; the dry gelatin having the greater refractivity, whereas the wet gelatin had a lesser refractivity. It is evident that there is a stage in the drying process when the damp gelatin will have a refractive index equal to that of the oil, and at this stage reflection at the faces of the droplets will cease and the appearance of the layer will pass from opaque to transparent. If a series of jellies are prepared, each member containing an oil of refractive index progressively different from its neighbor, then a series of adjacent areas may be coated therewith which will become transparent at progressively different degrees of dryness. Such a series may have at least one member in the transparent condition for any degree of atmospheric humidity to which the series may be exposed so that the development of transparency in any individual member may be used to indicate the humidity of the atmosphere and this is, in fact, the property utilized in the present invention.

It is evident that instead of varying the refractive index of the oil from member to member, the avidity for water may be varied instead by inclusion of progressive quantities of a hygroscopic substance. It is further evident that many pairs of materials, one or both members of which may be hygroscopic, may be used in place of the oil and wet gelatin. It has been found that solid waxes or resins when powdered and incorporated with gelatin, agar-agar or starch are useful for the purpose of this invention and any solid substantially insoluble in water and having appropriate refractive index may be used, for example carnauba wax (refractive index 1.452—1.454) or myrtle wax (refractive index 1.46). The dispersion mixtures are not limited to emulsions, the case cited above being by way of example only, since there are many ways in which the invention may be applied.

For a clearer understanding of the invention reference is made to Fig. 1 showing a front view of a hygrometer constructed according to one form of the invention; Fig. 2 is a sectional view taken on the line 2—2 of Fig. 1; Fig. 3 is a horizontal sectional view on line 3—3 of Fig. 4 and Fig. 4 is a front view of a portion of a modified form of the invention wherein the indicating areas are surrounded by an opalescent wedge. Figs. 5 and 6 are similar views representing the modified form of the invention wherein an imperforate wedge is substituted for the perforated wedge of Figs. 3 and 4. Fig. 7 shows an application of the invention to a humidity regulating system.

In the arrangement of Fig. 1, 6 designates a supporting base of any convenient shape on which there is mounted a plate 7 of glass or other suitable inert material which has relatively great thickness. The glass may be black or transparent or may be backed by a layer of black material 8 which may be velvet or black enamel to give a suitable dark background. This layer may be protected by a sheet of metal 9, while at the top of the plate there is mounted a lamp house 10, open at its bottom which contains a light source such as an elongated electric light bulb 11. This housing is such that the light is reflected downward through the bottom of the housing 10, so that the light passes uniformly into the edge of the plate.

Onto the front of plate 7 a series of dried emulsion areas 13 to 18 inclusive, are coated or fastened in intimate contact with the glass. The compositions of these emulsion areas are varied progressively in a manner which will be described later such, that the areas situated toward one end of the plate become more transparent in dry atmospheres. Intermediate humidities within the range of the instrument render one or another of the central areas such as 16, transparent, with opacity or opalescense developing continuously on either side. By calibrating the series in atmospheres of known humidity, the water content of any unknown atmosphere may be determined by inspection. While, of course, the sensitive areas may be observed by any suitable light, the method of illumination above described provides an excellent dark background, with a relatively powerful illumination of the opalescent material, received by internal reflection from the glass plate, which appears quite dark except where coated with emulsion.

Instead of providing progressively different areas of sensitive material, each area may resemble its fellows in thickness and composition, and may be surrounded but not covered, as shown in the modification of Figs. 3 and 4, by a wedge 12 of opalescent material conveniently formed from a suspension of light-reflecting particles in gelatin which is unaffected by moisture. It being understood that the areas 13 to 18 are uncovered and absorb moisture as described in connection with Figs. 1 and 2. Since the wedge will always appear transparent at one end, becoming continuously more opaque toward the other, and the opacities of the enclosed areas are identical and will vary with the absorbed moisture there will be some intermediate position varying with the humidity where a match will be obtained with one of the enclosed areas.

The sensitive opalescent material is most conveniently made from emulsions of oil and gelatin solutions, since oils or mixtures of oils may be prepared having any desired refractive index intermediate between that of water and dry gelatin. For each area such as 13 to 18, four parts of gelatin are first swollen and then melted in sixteen parts of water made slightly alkaline with ammonia. Into this solution one part of oil is poured and the two are emulsified in a colloid mill or by other well known means. The composition of the oil may be varied very simply from area to area by using mixtures of two oils of widely different refractive indices. One such oil is palm nut oil, $r_D=1.43$, and another is clove oil, $r_D=1.53$. Emulsions containing only oil of clove will be transparent in the driest atmospheres, while those with a large proportion of palm nut oil lose opacity as the atmosphere becomes saturated. To increase the dried emulsion's avidity for water a hygroscopic substance of high refractive index may be incorporated such as glycerin. Alternatively, deliquescent solutions such as calcium chloride or barium perchlorate may be added. It is evident that the exact composition providing transparency for any particular atmospheric condition must be determined by the exact nature of the emulsified materials available for use. The following composition of area coating, however, is quite typical and is given by way of example only:

| | |
|---|---|
| Gelatin | 20 grams |
| Water | 80 cc. |
| Ammonia sp. gr. .880 | 1 cc. |
| Glycerin | 2 cc. |
| Oil of cloves | 3 cc. |
| Palm nut oil | 1 cc. |

Melt; Emulsify and coat; Mix

This mixture when coated in thin layers, by spreading with a flat strip, sets to a while jelly, drying to a cream colored pellicle which still feels slightly damp to the touch. It becomes transparent in moderately damp atmospheres.

A further modified form of the invention is shown in Figs. 5, 6 which differs from the foregoing arrangements, by substituting for wedge 12 of Figs. 3, and 4 an unperforated strip 19 of sensitive opalescent material. This strip of material is prepared from gelatin, water, and oil as before, but the hydroscopic addition is omitted. After drying, the strip is rendered sensitive to moisture by spraying with, or dipping in a solution of a deliquescent salt in such a manner that there is little addition made to one end and progressing to much addition at the other end. The strip then develops a transparent region somewhere along its length during drying, which region shifts from one end to the other according to the humidity of the atmosphere.

This invention is particularly applicable for use in recording or controlling the humidity of rooms. Such an arrangement in one form is shown in Fig. 7, in which there is a light source 20, a filter 21 for filtering all rays except those which are required, a collimating lens 22, and a hygrometer 23, of the present arrangement. If it is assumed that the controlling system is used to keep a room at a fixed humidity, the hygrometer 23, will be treated with material as above described which becomes transparent at the desired humidity but at all other degrees of humidity is opaque. When the hygrometer becomes transparent, light from the light source 20, passes through the filter 21, lens 22, and the hygrometer 23, now transparent, and falls on a light sensitive cell or photoelectric cell 24. It is well-known that such cells have the characteristic of becoming conductors of electricity under the influence of light. The output of the cell 24 may be connected to an amplifier 25 preferably of the electron discharge type to amplify the output current of the photo-electric cell 24 so that this current will have sufficient magnitude to operate a solenoid valve 26 in a pipe 27 which serves to introduce steam or other source of moisture into the room whose humidity is being controlled. It will be understood that a recording device may be substituted for the valve 26 to be actuated by the amplifier 25.

What I claim is:

1. In a hygrometer, an indicator comprising an intimate admixture of two materials having initially different refractive indices, one of said materials being capable of absorbing from an atmosphere of appropriate humidity sufficient moisture to render its refractive index equal to that of the other material, and means for rendering visible the equality of refractive indices.

2. A hygrometer including a band of materials having such different refractive indices that it normally is opaque, one of said materials having a refractive index which varies with its moisture content and being capable of attracting sufficient moisture at a predetermined degree of humidity to render the refractive indices of said materials in a portion of said band of materials equal whereby an indication is given by a change in opacity of said portion.

3. In a hygrometer, a source of light, materials illuminated by said light and having such different refractive indices that light is normally diffused therethrough, one of said materials having a refractive index which varies with its moisture content and a substance associated with said materials and capable of attracting sufficient moisture at a predetermined degree of humidity to cause said one of the materials to so change its refractive index as to render said refractive indices equal whereby light is transmitted from said source through said materials.

4. In a hygrometer, a support, an indicator mounted on said support comprising gelatin the refractive index of which varies with its moisture content and a material having a refractive index between that of water and dry gelatin, a substance associated with said gelatin capable of absorbing moisture to render the refractive index of the gelatin equal to that of the material at a predetermined degree of humidity, and means for indicating when said gelatin and said material have equal refractive indices.

5. In a hygrometer a transparent support having a dark background, means for illuminating said support, a wedge shaped band of dry gelatin on said support formed by emulsifying oil with an aqueous gelatin solution, hydroscopic material in progressively increasing amounts along the band and associated with said band whereby in response to a predetermined degree of humidity, a portion of said band and associated material varies its transmission of light from said illuminated support.

6. The method of determining the degree of humidity which comprises applying light to two mediums normally having different refractive indices, at least one of said mediums having a refractive index which varies with its moisture content and being capable of absorbing moisture to render the refractive indices of said mediums equal in response to a predetermined degree of humidity, and observing the appearance of said materials.

7. The method of determining the degree of humidity which comprises applying a source of light to a band of different mediums having different refractive indices, the refractive index of one of said mediums having progressively increasing values along the band, at least one of said mediums having a refractive index which varies with its moisture content and being capable of absorbing moisture to render the refractive indices of certain portions of said mediums equal in response to a predetermined degree of humidity, and observing whether light is transmitted or diffused through the mediums.

KENNETH C. D. HICKMAN.